US011313998B2

(12) United States Patent
Kulkarni et al.

(10) Patent No.: US 11,313,998 B2
(45) Date of Patent: Apr. 26, 2022

(54) DISPLAY COVER FOR DIGITAL WRITING AND OPTICAL PERFORMANCE

(71) Applicant: Intel Corporation, Santa Clara, CA (US)

(72) Inventors: Shantanu D. Kulkarni, Hillsboro, OR (US); Prosenjit Ghosh, Portland, OR (US); Michael Daniel Rosenzweig, San Ramon, CA (US); Denica N. Larsen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 16/728,872

(22) Filed: Dec. 27, 2019

(65) Prior Publication Data

US 2020/0132892 A1  Apr. 30, 2020

(51) Int. Cl.
*G02B 5/02* (2006.01)
*G06K 9/22* (2006.01)

(52) U.S. Cl.
CPC ......... *G02B 5/0231* (2013.01); *G02B 5/0221* (2013.01); *G02B 5/0268* (2013.01); *G06K 9/222* (2013.01)

(58) Field of Classification Search
CPC .. G02B 5/0221; G02B 5/0231; G02B 5/0268; G06K 9/222
USPC ................................. 359/599, 601, 511, 613
See application file for complete search history.

(56) References Cited

U.S. PATENT DOCUMENTS

| | | | |
|---|---|---|---|
| 9,862,855 B2 * | 1/2018 | Yokoyama | C08J 7/046 |
| 2012/0194914 A1 * | 8/2012 | Van Nijnatten | A01G 9/1438 359/599 |
| 2016/0236975 A1 * | 8/2016 | Sugimoto | C03C 3/093 |
| 2017/0300116 A1 * | 10/2017 | Lyons | G07F 17/3206 |
| 2018/0364822 A1 * | 12/2018 | Taya | G06F 3/017 |

* cited by examiner

*Primary Examiner* — Thong Q Nguyen
(74) *Attorney, Agent, or Firm* — Fletcher Yoder, P.C.

(57) ABSTRACT

An embodiment of a method of manufacturing a cover lens for an electronic display includes etching a first surface geometry on a first surface of the cover lens. In the embodiment, the method includes determining a plurality of angles of refraction at the first surface from light generated from the electronic display based on the first surface geometry. In the embodiment, the method includes determining a second surface geometry for a second surface of the cover lens based on the plurality of angles of refraction at the first surface. In the embodiment, the method includes etching the second surface geometry on the second surface of the cover lens.

20 Claims, 5 Drawing Sheets

DISPLAY COVER FOR DIGITAL WRITING AND OPTICAL PERFORMANCE

BACKGROUND

The present disclosure relates generally to a display cover for improved digital writing feel and optical performance.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Digital writing is the practice of using a digital surface to receive input similar to a traditional pen and/or pencil and paper. For example, a digital surface can receive drawn images, text, numbers, and any other suitable form of writing. The digital surface may include an electronic display that displays the received writing. Due to differing physical characteristics, the material of the digital surface may feel unnatural to users commonly employing traditional pen and/or pencil and paper. As a result, frictional elements may be introduced on a cover lens disposed on the digital surface to generate natural physical characteristics resembling an interaction between traditional pen and/or pencil and paper. However, the frictional elements on the surface of the cover lens may scatter light transmitted or reflected from the electronic display. As a result, optical properties of the electronic display, such as haze, sharpness, and contrast, can be significantly diminished, obscuring or distorting images produced by the electronic display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method of manufacturing a cover lens for an electronic display includes etching a first surface geometry on first surface of the cover lens, determining a plurality of angles of refraction at the first surface from light generated from the electronic display based on the first surface geometry, determining a second surface geometry for a second surface of the cover lens based on the plurality of angles of refraction at the first surface, and etching the second surface geometry on the second surface of the cover lens.

In another embodiment, a cover lens for an electronic display includes a first surface geometry on a first surface of the cover lens. The first surface geometry interacts with a writing utensil and includes a surface roughness including a root mean square height in a range from 0.3 to 0.7 microns. The cover lens also includes a second surface geometry on a second surface of the cover lens. The second surface geometry refracts a ray of light moving in a first direction to a second direction. The first surface geometry refracts the ray of light moving in the second direction to a third direction and the third direction is substantially parallel to the first direction.

In yet another embodiment, an electronic display system includes an electronic display that generates a plurality of light rays moving in a first direction. The electronic display system also includes a cover lens coupled to the electronic display. The cover lens includes a first surface geometry on a first surface of the cover lens that interacts with a writing utensil. The first surface geometry includes a surface roughness including a root mean square height in a range from 0.3 to 0.7 microns. The cover lens also includes a second surface geometry on a second surface of the cover lens. The second surface geometry refracts at least one light ray of the plurality of light rays moving in the first direction to a second direction. The first surface geometry refracts the at least one light ray moving in the second direction to a third direction. The third direction is substantially parallel to the first direction.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
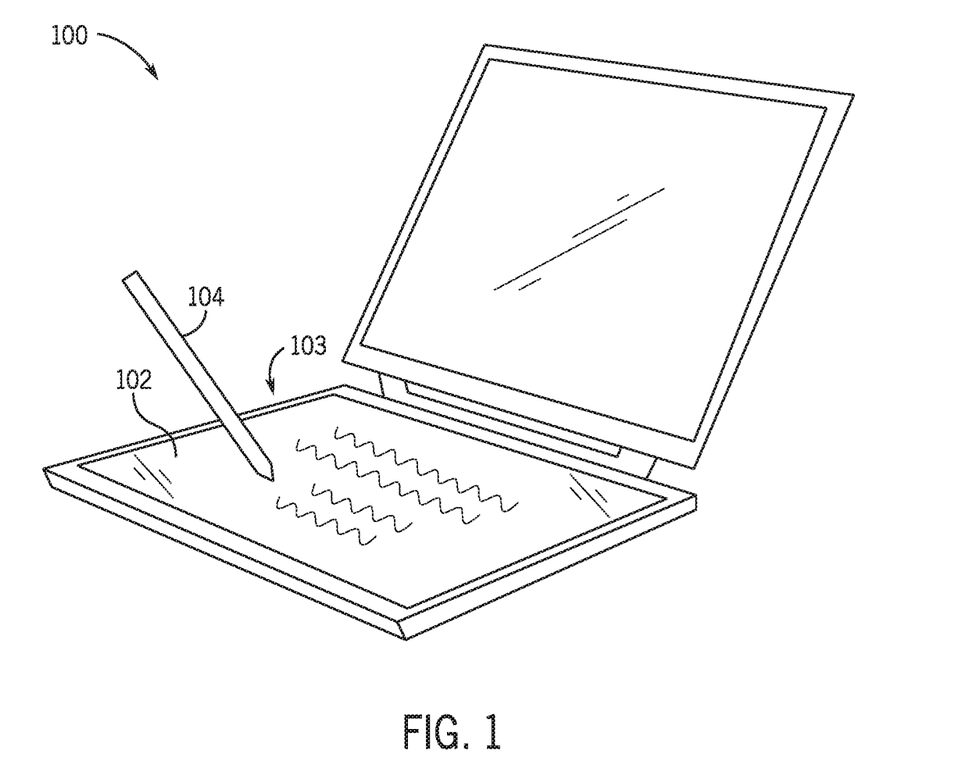
FIG. 1 illustrates a device incorporating a cover lens for an electronic display, in accordance with an embodiment of the present disclosure.

With the preceding in mind, FIG. 1 illustrates an electronic device 100 incorporating a cover lens 102 for an electronic display 103. In some embodiments, the electronic device 100 may also include a keyboard. The cover lens 102 may be a thin layer adhesively coupled (e.g., laminated or bonded) to the electronic display 103. The cover lens 102 may be formed of any suitable material that permits light transmitted or reflected by a plurality of pixels of the electronic display 103 to pass through the cover lens 102, such as a glass material. In some embodiments, the electronic device 100 may be a mobile device, a laptop, a personal computer, a tablet, eReader, eWriter a personal digital assistant, a watch, or any other suitable electronic device. The electronic device 100 may include a writing utensil, such as stylus 104. In certain embodiments, the writing utensil may be a pencil, a pen, a fingertip, or any other suitable writing device. The stylus 104 may interact with the electronic display assembly to produce a digital writing sample. For example, the stylus 104 may be moved over the cover lens 102 to produce written words, symbols, letters, numbers, figures, and any other suitable form of writing. In certain embodiments, the electronic display 103 may be a touchscreen display. For example, the electronic display 103 may include one or more sensors, such as capacitive or pressure sensors, to detect and indicate where a touch and/or pressure of a writing utensil is applied to the cover lens 102 and transferred through to the electronic display 103. In an example embodiment, the cover lens 102 may include one or more sensors, such as capacitive or pressure sensors, to detect and indicate where a touch and/or pressure of a writing utensil is applied to the cover lens 102. In another example embodiment, the cover lens 102 may include a touch layer to detect and indicate where a touch and/or pressure of a writing utensil is applied to the cover lens 102. In response to receiving the indication from the one or more sensors, the electronic display 103 may emit light in a different color from an initial, or background, color to display an image corresponding to the touch and/or pressure received. Light may be transmitted from the electronic display 103 and travel through the cover lens 102. For example, the electronic display 103 may generate light corresponding to a digital writing sample received at the cover lens 102. Light may be reflected from the electronic display 103 and travel through the cover lens 102.

Figure 2:
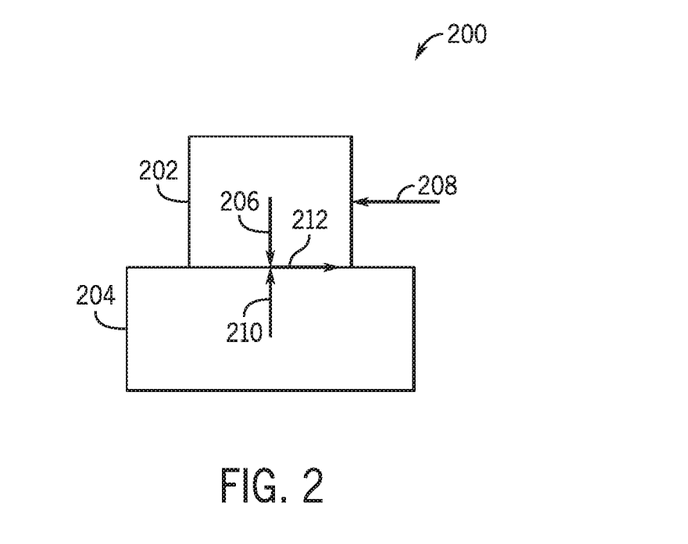
FIG. 2 illustrates a free body diagram of forces applied to a cover lens for an electronic display, in accordance with an embodiment of the present disclosure.

FIG. 2 illustrates a free body diagram 200 of applied forces on a cover lens 204, such as cover lens 102 in FIG. 1. Object 202 may be a writing utensil, such as stylus 104 in FIG. 1. To facilitate discussion related to frictional properties of the cover lens 204, a set of applied forces are shown. Object 202 may include a force 206 acting on a top surface of the cover lens 204. For example, the object 202 may produce force 206 when pushing down on the surface of the cover lens 204 while writing. A corresponding normal force 210 may act against a bottom surface of the object 202. The normal force 210 may be equal in magnitude and opposite in direction of the force 206. When a horizontal force 208 is applied to move the object 202 in a direction parallel to the top surface of the cover lens 204, a corresponding frictional force 212 may act against the direction of motion of object 202.

The frictional force 212 may be proportional to the normal force 210. For example, the frictional force 212 can be determined from the calculation: $F_f = \mu * F_n$, where $F_f$ is the frictional force, $\mu$ is a coefficient of friction, and $F_n$ is the normal force. The coefficient of friction depends on the material of an object, such as object 202, and the material of the surface, such as the top surface of cover lens 204, over which the object is moved. For an object at rest on a surface, a coefficient of static friction, $\mu_s$, indicates the relation between the frictional force 212 and the normal force 210. For an object in relative motion to a surface, a coefficient of kinetic friction, $\mu_k$, indicates the relation between the frictional force 212 and the normal force 210.

Figure 3:
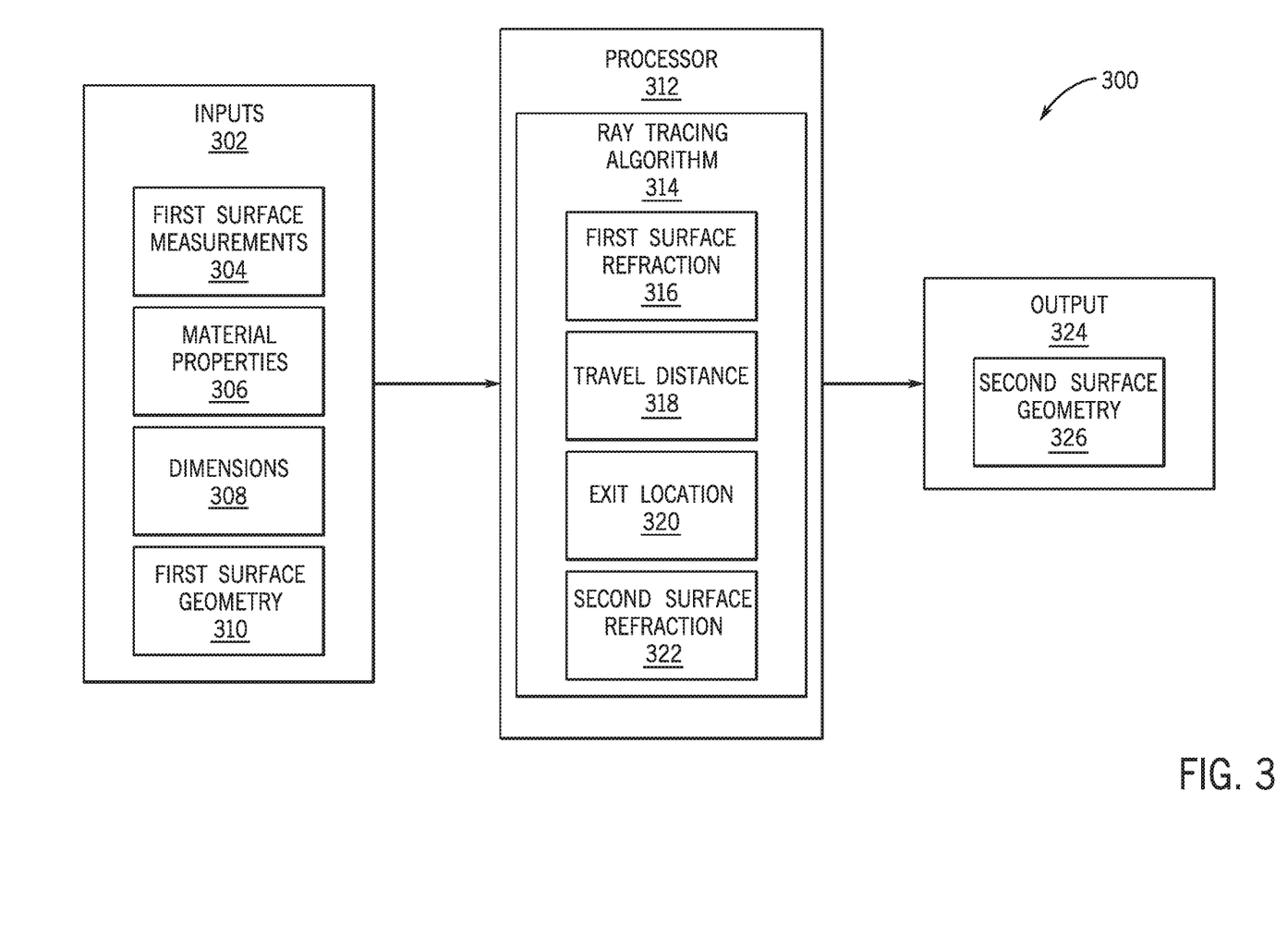
FIG. 3 illustrates a block diagram for manufacturing a cover lens for an electronic display, in accordance with an embodiment of the present disclosure.

With the preceding in mind, FIG. 3 illustrates a block diagram for a system 300 for designing and manufacturing a cover lens for an electronic display, such as electronic display 103 in FIG. 1, in accordance with an embodiment of the disclosure. In certain embodiments, the system 300 may be a computing device such as a personal computer, a laptop, a tablet, eReader, eWriter, a mobile device, a server, or any other suitable computing device. A processor 312 of the system 300 may receive a set of inputs 302. Additionally, the processor 312 may include one or more general purpose microprocessors, one or more application specific processors (ASICs), and/or one or more field programmable logic arrays (FPGAs). The set of inputs 302 may include a set of first surface measurements 304 from a first surface (e.g., a top surface) of a cover lens, such as cover lens 102 in FIG. 1, a set of material properties 306 of the cover lens, a set of dimensions 308 of the cover lens, and a first surface geometry 310 of the cover lens. In certain embodiments, the set of first surface measurements 304 may include a static coefficient of friction for an interaction between a writing utensil and the first surface of the cover lens, a kinetic coefficient of friction for an interaction between a writing utensil and the first surface of the cover lens, a surface roughness of the cover lens, and any other suitable surface finish measurement for the first surface. In certain embodiments, the static coefficient of friction for an interaction between a writing utensil and the first surface of the cover lens may be a range between 0.5 and 1 (e.g., between 0.6 and 0.9, between 0.7 and 0.8, and so on) inclusive of both ends of the range. In certain embodiments, the kinetic coefficient of friction for an interaction between a writing utensil and the first surface of the cover lens may be a range between 0.05 and 0.35 (e.g., between 0.1 and 0.25, between 0.14 and 0.19 and so on) inclusive of both ends of the range. The surface roughness of the first surface may be measured by the root mean square height of an area of the first surface. The processor 312 may compute the standard deviation of the amplitudes of the first surface geometry to determine the root mean square height. In certain embodiments, the root mean square height of the first surface may be a range between 0.1 and 1 microns (e.g., between 0.2 and 0.9 microns, between 0.3 and 0.7 microns and so on) inclusive of both ends of the range.

In some embodiments, the set of material properties 306 of the cover lens may include a set of optical properties. For example, the set of optical properties may include a transmittance through the cover lens, a haze of the cover lens, an index of refraction of the cover lens, an index of refraction of a first material surrounding the first surface of the cover lens, an index of refraction of a second material surrounding the second surface of the cover lens, and a low amount of visual sparkle upon inspection. In certain embodiments, the transmittance through the cover lens material may be at least sixty percent or greater (e.g., at least seventy five percent, at least ninety percent, and so on). In certain embodiments, the haze of the cover lens material may be less than fifty percent (e.g., less than forty percent, less than thirty percent, and so on).

In some embodiments, the set of dimensions 308 of the cover lens may include a thickness of the cover lens. For example, the thickness of the cover lens may be a range between 0.2 and 5 mm (e.g., between 0.3 and 0.8 mm, between 0.4 and 0.7 mm, and so on) inclusive of both ends of the range. In some embodiments, the first surface geometry 310 may include a three dimensional surface profile of the first surface. For example, the three dimensional surface profile may be measured by a profilometer. The three dimensional surface profile may indicate locations of a set of peaks and/or a set of valleys of the first surface geometry of the cover lens.

The processor 312 may generate an output 324 that includes a second surface geometry 326 (e.g., of a bottom surface) of the cover lens based on the set of inputs 302. For example, the processor 312 may generate the second surface geometry 326 such that light generated by an electronic display may pass through the cover lens without significant distortion of the light and/or an image corresponding to the generated light. The processor 312 may generate the output 324 by executing any suitable algorithm, such as a ray tracing algorithm 314, in response to receiving the set of inputs 302. In certain embodiments, the ray tracing algorithm 314 may be a set of instructions to be performed by the processor 312. For example, the ray tracing algorithm may be software stored in a memory and/or a storage device of the system 300. In some embodiments, the memory may include one or more tangible, non-transitory computer readable-media that store instructions executable by the processor 312 and/or data to be processed by the processor 312. For example, the memory may include random access memory (RAM), read only memory (ROM), rewritable non-volatile memory, such as flash memory, hard drives, optical discs, and/or the like. The ray tracing algorithm 314 may receive the set of inputs 302, and generate output 324 that includes a second surface geometry 326 (e.g., of a bottom surface) of the cover lens. The ray tracing algorithm 314 may include a first surface refraction component 316, a travel distance component 318, an exit location component 320, and a second surface refraction component 322. The first surface refraction component 316 may determine an angle of refraction, such as angle 516 in FIG. 5, for a ray of light, such as ray of light 512 in FIG. 5, exiting an interior of the cover lens through the first surface of the cover lens. The first surface refraction component 316 may assume the exiting ray of light is travelling in a direction, indicated by the arrow at the end of ray of light 512, substantially parallel to a ray of light, such as ray of light 508 in FIG. 5, entering the cover lens (e.g., exiting the electronic display), and/or substantially parallel to the y-axis in FIG. 5. For example, the exiting ray of light may be within twenty degrees of parallel (e.g., within ten degrees of parallel, within five degrees of parallel, and so on).

The first surface refraction component 316 may determine the angle of refraction based on the first surface geometry, the indices of refraction of the cover lens material, and the first material surrounding the first surface of the cover lens (e.g., air). For example, the first surface refraction component 316 may determine a surface normal direction, such as normal direction 514 in FIG. 5, pointing outwards from the cover lens based on the first surface geometry. For example, the normal direction 514 points outward perpendicular to the first surface geometry 506 in FIG. 5. The first surface refraction component 316 may determine the difference in angle, such as angle 516 in FIG. 5, between the surface normal direction and the substantially parallel direction of the exiting ray of light. The first surface refraction component 316 may determine a direction of travel for the ray of light, such as ray of light 510 in FIG. 5 with a direction of travel indicated by the arrow at the end of ray of light 510, moving through the cover lens based on the determined difference in angle and the indices of refraction of the cover lens material and the first material.

The travel distance component 318 may determine a distance the ray of light travels through the interior of the cover lens. For example, the travel distance component 318 may use the determined direction of travel and the measured thickness of the cover lens to determine the travel distance for the ray of light. The exit location component 320 may determine an exit location for the ray of light on the second surface of the cover lens. For example, the exit location component 320 may use the determined travel distance, the determined direction of travel, and the measured thickness of the cover lens to determine an exit location for the ray of light along the second surface of the cover lens.

Figure 5:
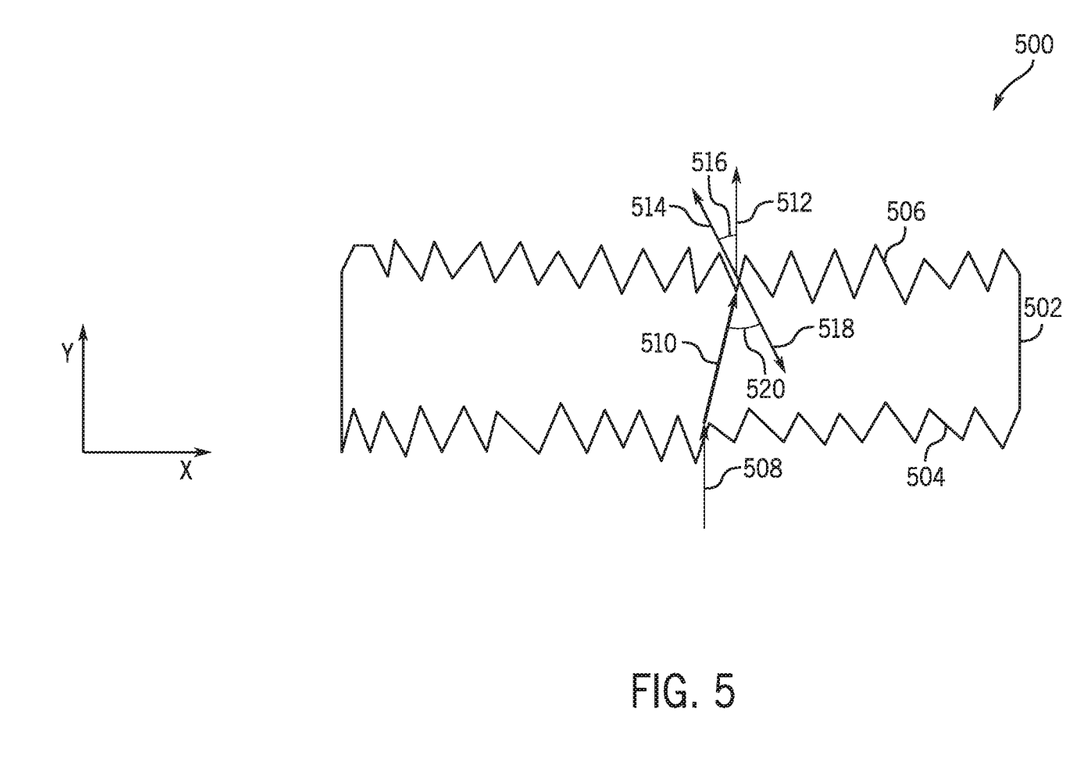
FIG. 5 illustrates a cover lens for an electronic display having a first surface geometry and a second surface geometry, in accordance with an embodiment of the present disclosure.

The second surface refraction component 322 may determine an angle of refraction for a ray of light entering an interior of the cover lens through the second surface of the cover lens. The second surface refraction component 322 may assume the entering ray of light, such as ray of light 508 in FIG. 5, is travelling in a direction substantially parallel to the ray of light emitted by the electronic display (e.g., exiting the electronic display) and/or substantially parallel to the y-axis in FIG. 5. For example, the entering ray of light may be within five degrees of parallel. In certain embodiments, the entering ray of light is the ray of light emitted by the electronic display. The second surface refraction component 322 may determine a second surface geometry that refracts the entering ray of light from a first direction (e.g., substantially parallel to the ray of light emitted by the electronic display) to a second direction of travel (e.g., the direction of travel determined using the first surface refraction component 316). The second surface refraction component 322 may determine the surface geometry required to refract the entering ray of light based on an index of refraction of the cover lens material, an index of refraction of the second material surrounding the second surface of the cover lens (e.g., electronic display material), the first or initial direction of travel (e.g., substantially parallel to the ray of light emitted by the electronic display), and the second or final direction of travel (e.g., the determined direction of travel from first surface refraction component 316). The ray tracing algorithm 314 may repeat this process at a plurality of locations along the first surface of the cover lens to determine a second surface geometry 326 of the second surface of the cover lens. For example, the ray tracing algorithm 314 may repeat this process at each pixel of the electronic display, each group of pixels of the electronic display, each portion of the first surface geometry of the cover lens at which the angle of incidence changes, and so on.

Figure 4:
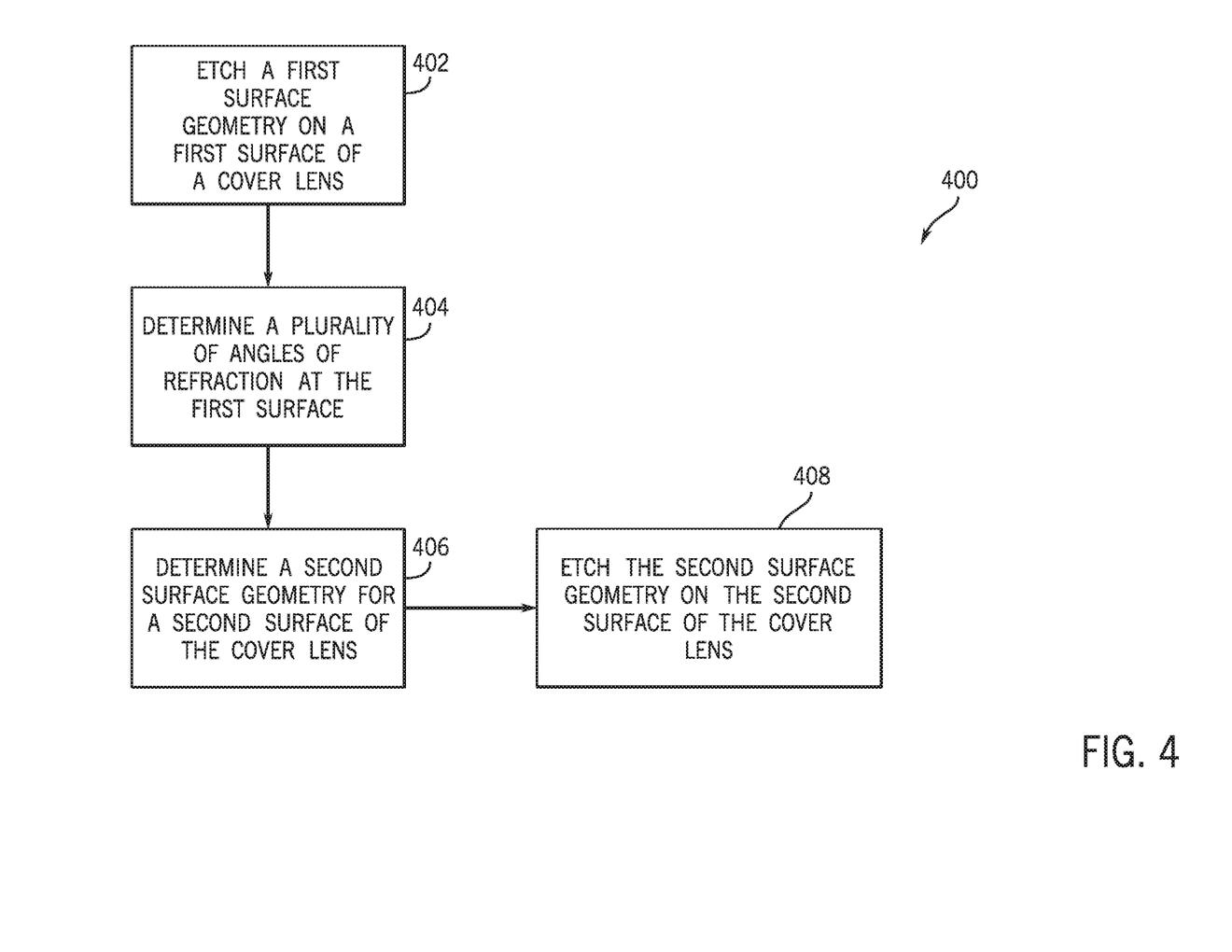
FIG. 4 illustrates a flow diagram of a process for manufacturing a cover lens for an electronic display, in accordance with an embodiment of the present disclosure.

With the preceding in mind, FIG. 4 illustrates a flow diagram of a process 400 for manufacturing a cover lens for an electronic display, in accordance with an embodiment of the disclosure. While the process 400 is described as being performed by the processor 312, it should be understood that the process 400 may be performed by any suitable device that may control and/or communicate with components of a cover lens manufacturing system. Furthermore, while the process 400 is described using steps in a specific sequence, it should be understood that the present disclosure contemplates that the described steps may be performed in different sequences than the sequence illustrated, and certain described steps may be skipped or not performed altogether. In some embodiments, the process 400 may be implemented by executing instructions stored in a tangible, non-transitory, computer-readable medium using any suitable processing circuitry, such as the processor 312.

As illustrated, in process 400, a first surface geometry is etched on a first surface of a cover lens (step 402). In some embodiments, the first surface geometry may be mechanically etched on the first surface of the cover lens. For example, the first surface geometry may be mechanically etched by abrasive blasting of the first surface, milling the first surface, and any other suitable mechanical processes for creating the first surface geometry. In certain embodiments, the first surface geometry may be chemically etched on the first surface of the cover lens. For example, the first surface geometry may be chemically etched by exposing the first surface of the cover lens to an acidic or caustic substance for a predetermined period of time. In some embodiments, the first surface geometry may be mechanically etched onto a mold for forming the cover lens. For example, the first surface geometry may be mechanically etched into the mold and the cover lens may be subsequently cast in the mold to form the first surface geometry.

A set of measurements for the cover lens may be received, for example, at the processor 312 of FIG. 3. In certain embodiments, the set of measurements may include a thickness of the cover lens, a static coefficient of friction of the cover lens, a kinetic coefficient of friction of the cover lens, and/or the first surface geometry of the first surface of the cover lens. For example, the first surface geometry may be measured by a profilometer.

Additionally or alternatively, a set of material properties for the cover lens may be received, for example, at the processor 312 of FIG. 3. In certain embodiments, the set of material properties may include an index of refraction of the cover lens material, a haze of the cover lens material, and a transmittance of the cover lens material. At step 404, a plurality of angles of refraction at a plurality of locations at the first surface are determined. In some embodiments, the processor 312 may determine the plurality of angles of refraction using the first surface geometry and the index of refraction of the cover lens material. In certain embodiments, the processor 312 may assume a ray of light exiting the first surface of the cover lens at a first point may be substantially parallel to the ray of light entering the cover lens (e.g., exiting the electronic display), and/or substantially parallel to the y-axis as shown in FIG. 5. For example, the ray of light may be within five degrees of parallel. The processor 312 may determine the angle of refraction, such as angle 520 in FIG. 5, inside the first surface of the cover lens using an angle of incidence, such as angle 516 in FIG. 5, as the ray of light leaves the first surface of the cover lens, the index of refraction of the cover lens material, and the index of refraction of the material surrounding the first surface of the cover lens, such as atmosphere. For example, the angle of refraction may be determined using the formula:

$$n_1 * \sin\theta_1 = n_2 * \sin\theta_2 \quad \text{(Equation 1)}$$

where:

$n_1$ is the index of refraction of the material surrounding the first surface of the cover lens;

$\theta_1$ is the angle of incidence (e.g., angle 516) measured from the normal direction (e.g., direction 514 in FIG. 5) of the first surface geometry pointing outwards from the cover lens;

$n_2$ is the index of refraction of the cover lens material; and $\theta_2$ is the angle of refraction (e.g., angle 520) measured from the normal direction (e.g., direction 518 in FIG. 5) of the first surface geometry pointing inwards into the cover lens.

The processor 312 may determine the angle of incidence using the first surface geometry and the assumed direction of the ray of light exiting the first surface of the cover lens. For example, the processor 312 may determine a normal direction from the first surface geometry of the cover lens and calculate an angular difference between the normal direction and the assumed direction of the ray of light. The processor 312 may repeat this step at a plurality of locations along the first surface to determine a plurality of angles of refraction at the first surface of the cover lens.

At step 406, the processor 312 may determine a second surface geometry for a second surface of the cover lens. In some embodiments, the processor 312 may determine a distance traveled for a ray of light through the cover lens. For example, the processor 312 may determine the distance traveled from a first point at which the ray of light exits the cover lens through the first surface of the cover lens to a second point at which the ray of light enters the cover lens through the second surface of the cover lens. The processor 312 may determine the distance travelled based on the calculated angle of refraction at the first point on the first surface of the cover lens and the thickness of the cover lens. In certain embodiments, the processor 312 may determine an angle of refraction for the ray of light at the second surface. The processor 312 may assume the ray of light entering the second surface of the cover lens at the second point may be substantially parallel to the ray of light entering the cover lens (e.g., exiting the electronic display), and/or substantially parallel to the y-axis shown in FIG. 5. Using the angle of refraction formula and the known material properties of the cover lens and the material surrounding the second surface of the cover lens, the processor 312 may determine an angle of incidence for the ray of light and an angle of refraction for the ray of light at the second point on the second surface of the cover lens. The processor 312 may determine the second surface geometry based on the angle of incidence and the angle of refraction at the second point on the second surface of the cover lens. For example, the angle of incidence and/or the angle of refraction may be used to calculate a normal direction from the second surface at the second point. The processor 312 may repeat this step at a plurality of locations along the first surface to determine a second surface geometry for a plurality of locations along the second surface of the cover lens. For example, the processor 312 may repeat this process at each pixel of the electronic display, each group of pixels of the electronic display, each portion of the first surface geometry of the cover lens at which the angle of incidence changes, and so on. Light emitted from pixels of the electronic display may be emitted in a direction normal to the electronic display. Accordingly, at step 406, the processor 312 determines the second surface geometry required to ensure the light exiting the cover lens travels in the same direction, thus preventing and/or reducing distortion or warping of an image generated by the electronic display.

In certain embodiments, determining the second surface geometry at step 406 includes determining and/or ensuring at least one of a haze of the cover lens, a clarity of the cover lens, and/or a transmittance of the cover lens satisfy a threshold amount. Haze is a measure of the amount of light subject to wide angle scattering (greater than 2.5 degrees from normal) when passing through a material. Clarity is a measure of the amount of light subject to narrow angle scattering (less than 2.5 degrees from normal) when passing through a material. In certain embodiments, the threshold haze may be less than fifty percent (e.g., less than forty percent, less than thirty percent, and so on). In certain embodiments, the threshold clarity may be seventy five percent or greater (e.g., eighty percent or greater, ninety percent or greater, and so on). In certain embodiments, the threshold transmittance may at least sixty percent or greater (e.g., at least seventy five percent, at least ninety percent, and so on).

At step 408, the second surface geometry may be etched onto the second surface of the cover lens. In some embodiments, the second surface geometry may be mechanically etched on the second surface of the cover lens. For example, the second surface geometry may be mechanically etched by abrasive blasting of the second surface, milling the second surface, and any other suitable mechanical processes for creating the second surface geometry. In certain embodiments, the second surface geometry may be chemically etched on the second surface of the cover lens. For example, the second surface geometry may be chemically etched by exposing the second surface of the cover lens to an acidic or caustic substance for a predetermined period of time. In some embodiments, the second surface geometry may be mechanically etched onto a mold for forming the cover lens. For example, the second surface geometry may be mechanically etched into the mold and the cover lens may be subsequently cast in the mold to form the second surface geometry.

If the cover lens fails to satisfy at least one of the threshold haze, the threshold clarity, and the threshold transmittance, the process 400 may return to step 404 to determine a second plurality of angles of refraction at the first surface at a second plurality of locations at the first surface. In certain embodiments, the second plurality of locations may differ in at least one location from the first plurality of locations. The process 400 may continue to generate a third surface geometry for the second surface. The processor 312 may determine and/or ensure the cover lens having the third surface geometry satisfies at least one of the threshold haze, the threshold clarity, and the threshold transmittance. In this manner, the process 400 may iterate and generate successive surface geometries for the second surface of the cover lens until at least one of the threshold haze, the threshold clarity, and the threshold transmittance is satisfied. The process 400 may continue by etching the surface geometry onto the second surface of the cover lens.

With the preceding in mind, FIG. 5 illustrates a cover lens 500 for an electronic display having a first surface geometry 506 and a second surface geometry 504, in accordance with an embodiment of the present disclosure. In certain embodiments, the first surface geometry 506 may be a surface geometry of a top surface of the cover lens 500. In certain embodiments, the first surface geometry 506 may include a set of peaks and a set of valleys, though it should be understood that FIG. 5 is illustrated to clarify the concepts of the present disclosure, and thus may not be drawn to scale. The set of peaks and the set of valleys may serve to replicate a more natural or pleasing digital writing surface. In certain embodiments, the second surface geometry 504 may be a surface geometry of a bottom surface of the cover lens 500. In certain embodiments, the second surface geometry 504 may also include a set of peaks and a set of valleys. In some embodiments, the first surface may be opposite the second surface. For example, the first surface may face an opposite direction from the second surface. Indeed, the second surface may be disposed on top of and/or in contact with a electronic display, while the first surface may be viewed and contacted (e.g., touched) by a user. In certain embodiments, the cover lens 500 may be formed of a material 502 with a set of optical properties. For example, the material 502 may include an index of refraction, a haze, a low amount of visual sparkle upon inspection, and a transmittance. In some embodiments, the haze of the material 502 may be less than fifty percent (e.g., less than forty percent, less than thirty percent, and so on). In some embodiments, the transmittance of the material 502 may at least sixty percent or greater (e.g., at least seventy five percent, at least ninety percent, and so on).

An incident ray of light 508 may enter the interior of the cover lens 500 at a location on the second surface geometry 504. Prior to entering the interior of the cover lens 500, the incident ray of light 508 may be travelling in an initial direction, indicated by the arrow at the end of the incident ray of light 508, substantially parallel to the y-axis. For example, the incident ray of light 508 may be within five degrees of parallel to the y-axis. In some embodiments, the incident ray of light may be supplied by one or more pixels of a electronic display disposed underneath the cover lens 500. The second surface geometry 504 refracts the incident ray of light 508 to produce the refracted ray of light 510. The refracted ray of light 510 travels in a refracted direction, indicated by the arrow at the end of the refracted ray of light 510, which deviates from the initial direction of travel, indicated by the arrow at the end of the incident ray of light 508. The refracted ray of light 510 travels through the interior of the cover lens 500 to a location on the first surface geometry 506 of the cover lens 500. At the location, the first surface geometry 506 refracts the previously refracted ray of light 510 to produce an exiting ray of light 512 which exits the cover lens 500 and travels in a direction substantially parallel to the initial direction of travel and/or the y-axis. For example, the exiting ray of light 512 may be within five degrees of parallel.

In certain embodiments, the first surface geometry 506 may include a set of properties. The set of properties of the first surface geometry may include a static coefficient of friction for an interaction between a writing utensil and the first surface of the cover lens, a kinetic coefficient of friction for an interaction between a writing utensil and the first surface of the cover lens, a surface roughness of the cover lens, and any other suitable surface finish measurement for the first surface. In certain embodiments, the static coefficient of friction for an interaction between a writing utensil and the first surface of the cover lens may be a range between 0.5 and 1 (e.g., between 0.6 and 0.9, between 0.7 and 0.8, and so on) inclusive of both ends of the range. In certain embodiments, the kinetic coefficient of friction for an interaction between a writing utensil and the first surface of the cover lens may be a range between a writing utensil and the first surface of the cover lens may be a range between 0.05 and 0.35 (e.g., between 0.1 and 0.25, between 0.14 and 0.19 and so on) inclusive of both ends of the range. The surface roughness of the first surface may be measured by the root mean square height of an area of the first surface. The processor 312 may compute the standard deviation of the amplitudes of the first surface geometry to determine the root mean square height. In certain embodiments, the root mean square height of the first surface may be a range between 0.1 and 1 microns (e.g., between 0.2 and 0.9 microns, between 0.3 and 0.7 microns and so on) inclusive of both ends of the range.

Figure 6:
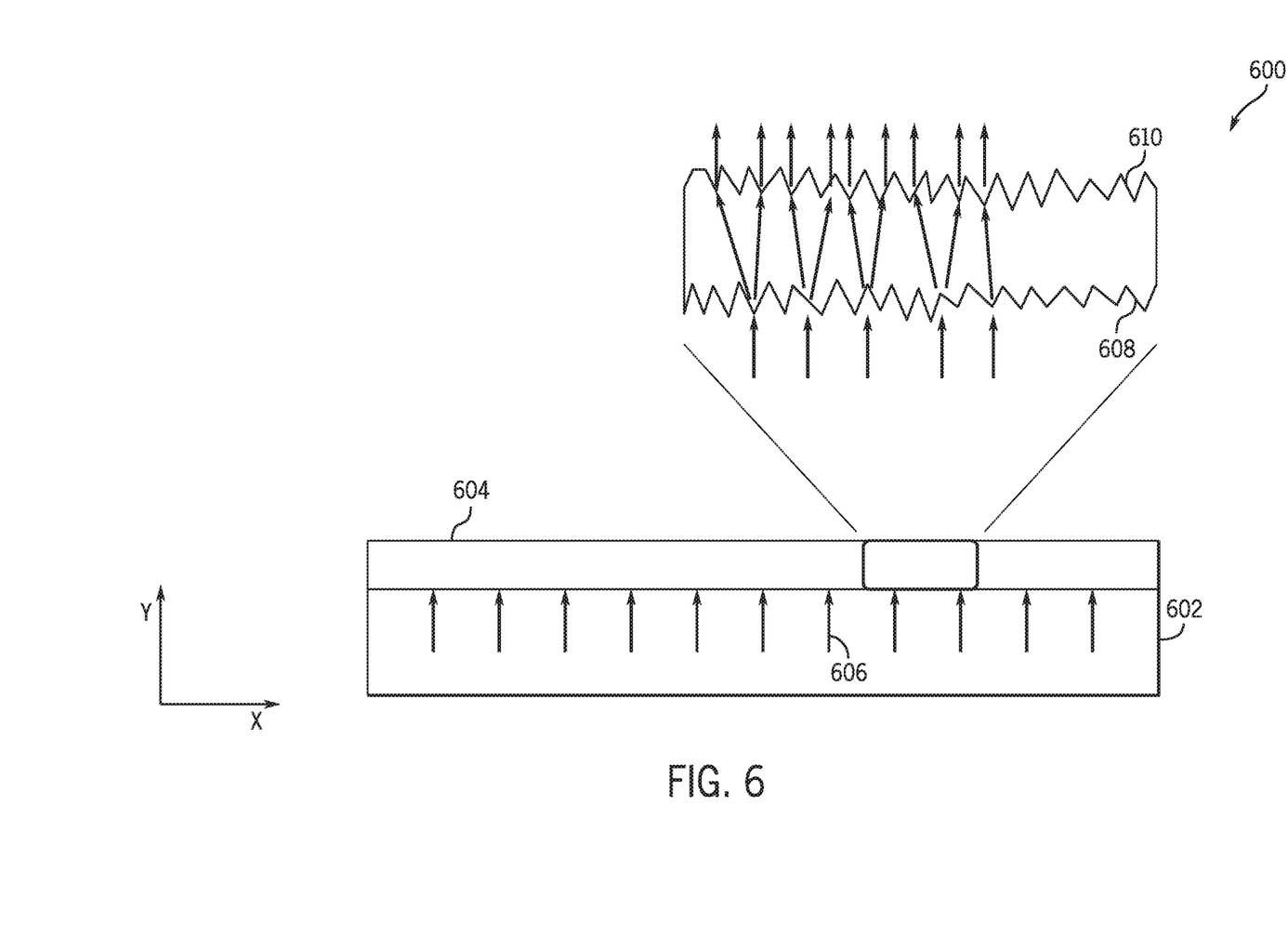
FIG. 6 illustrates an electronic display system incorporating a cover lens for an electronic display having a first surface geometry and a second surface geometry, in accordance with an embodiment of the present disclosure.

With the preceding in mind, FIG. 6 illustrates an electronic display system 600 incorporating a cover lens 604 for an electronic display 602 having a first surface geometry 610 and a second surface geometry 608, in accordance with an embodiment of the present disclosure. The cover lens 604 may be disposed on and/or coupled to the electronic display 602. For example, the cover lens 604 may be adhesively coupled to the electronic display 602. The electronic display 602 may generate a plurality of light rays 606 to pass through the cover lens 604. For example, each light ray may be generated by a corresponding pixel of the electronic display 602. Each of the plurality of light rays 606 may be travelling in an initial direction substantially parallel to a y-axis. For example, the light rays may be within five degrees of parallel. The plurality of light rays 606 may enter the cover lens 604 through the second surface geometry 608. The second surface geometry 608 may refract the plurality of light rays 606 as the plurality of light rays 606 enter the cover lens 604. The first surface geometry 610 may refract the plurality of light rays 606 exiting the cover lens to a direction substantially parallel to the initial direction. For example, the plurality of light rays may be within five degrees of parallel.

In certain embodiments, the first surface geometry 610 may include a set of properties. The set of properties of the first surface geometry may include a static coefficient of friction for an interaction between a writing utensil and the first surface of the cover lens, a kinetic coefficient of friction for an interaction between a writing utensil and the first surface of the cover lens, a surface roughness of the cover lens, and any other suitable surface finish measurement for the first surface. In certain embodiments, the static coefficient of friction for an interaction between a writing utensil and the first surface of the cover lens may be a range between 0.5 and 1 (e.g., between 0.6 and 0.9, between 0.7 and 0.8, and so on) inclusive of both ends of the range. In certain embodiments, the kinetic coefficient of friction for an interaction between a writing utensil and the first surface of the cover lens may be a range between a writing utensil and the first surface of the cover lens may be a range between 0.05 and 0.35 (e.g., between 0.1 and 0.25, between 0.14 and 0.19 and so on) inclusive of both ends of the range. The surface roughness of the first surface may be measured by the root mean square height of an area of the first surface. The processor 312 may compute the standard deviation of the amplitudes of the first surface geometry to determine the root mean square height. In certain embodiments, the root mean square height of the first surface may be a range between 0.1 and 1 microns (e.g., between 0.2 and 0.9 microns, between 0.3 and 0.7 microns and so on) inclusive of both ends of the range.

In some embodiments, a set of material properties of the cover lens 604 may include a set of optical properties. For example, the set of optical properties may include a transmittance through the cover lens, a haze of the cover lens, an index of refraction of the cover lens, and a low amount of visual sparkle upon inspection. In certain embodiments, the transmittance through the cover lens material may at least sixty percent or greater (e.g., at least seventy five percent, at least ninety percent, and so on). In certain embodiments, the haze of the cover lens material may be less than fifty percent (e.g., less than forty percent, less than thirty percent, and so on). In some embodiments, a set of dimensions of the cover lens may include a thickness of the cover lens. For example, the thickness of the cover lens measured between the first surface geometry 610 and the second surface geometry 608 may be a range between 0.2 and 5 mm, inclusive of both ends of the range. In some embodiments, the first surface geometry 610 may include a three dimensional surface profile of the first surface. For example, the three dimensional surface profile may be measured by a profilometer. The three dimensional surface profile may indicate locations of a set of peaks and/or a set of valleys of the first surface geometry of the cover lens.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A cover lens for an electronic display, comprising:
a first surface geometry on a first surface of the cover lens, the first surface geometry configured to interact with a writing utensil, the first surface geometry comprising a surface roughness including a root mean square height in a range from 0.3 to 0.7 microns; and
a second surface geometry on a second surface of the cover lens, wherein:
the second surface geometry is configured to refract a ray of light moving in a first direction to a second direction; and
the first surface geometry is configured to refract the ray of light from the second direction to a third direction, the third direction substantially parallel to the first direction.

2. The cover lens of claim 1, wherein the first surface geometry is chemically etched.

3. The cover lens of claim 1, wherein a kinetic coefficient of friction between the writing utensil and the first surface geometry is in a range between 0.1 and 0.25.

4. The cover lens of claim 1, wherein a thickness measured between the first surface geometry and the second surface geometry is in a range between 0.4 and 0.7 millimeters.

5. The cover lens of claim 1, wherein the first surface geometry comprises a set of peaks and a set of valleys.

6. The cover lens of claim 1, wherein the second surface geometry comprises a set of peaks and a set of valleys.

7. The cover lens of claim 1, wherein the second surface geometry is chemically etched.

8. The cover lens of claim 1, wherein the second surface is an opposite surface from the first surface.

9. An electronic display system, comprising:
a electronic display configured to generate a plurality of light rays moving in a first direction;
a cover lens coupled to the electronic display, comprising:
a first surface geometry on a first surface of the cover lens, the first surface geometry configured to interact with a writing utensil, the first surface geometry comprising a surface roughness including a root mean square height in a range from 0.3 to 0.7 microns; and
a second surface geometry on a second surface of the cover lens, wherein:

the second surface geometry is configured to refract at least one light ray of the plurality of light rays moving in the first direction to a second direction; and the first surface geometry is configured to refract the at least one light ray from the second direction to a third direction, the third direction substantially parallel to the first direction.

10. The electronic display system of claim 9, wherein a transmittance through the cover lens is at least ninety percent.

11. The electronic display system of claim 9, wherein a haze of the cover lens is lower than thirty percent.

12. The electronic display system of claim 9, wherein the cover lens is adhesively coupled to the electronic display.

13. An electronic display system, comprising:
a electronic display configured to generate a plurality of light rays moving in a first direction;
a cover lens coupled to the electronic display, wherein a transmittance through the cover lens is at least ninety percent, comprising:
a first surface geometry on a first surface of the cover lens, the first surface geometry configured to interact with a writing utensil; and
a second surface geometry on a second surface of the cover lens, wherein:
the second surface geometry is configured to refract at least one light ray of the plurality of light rays moving in the first direction to a second direction; and
the first surface geometry is configured to refract the at least one light ray from the second direction to a third direction, the third direction substantially parallel to the first direction.

14. The electronic display system of claim 13, wherein a static coefficient of friction between the writing utensil and the first surface geometry is in a range between 0.5 and 1.

15. The electronic display system of claim 13, wherein the first surface geometry includes a root mean square height in a range from 0.1 to 1 microns.

16. The electronic display system of claim 13, wherein a thickness of the cover lens is in a range between 0.2 and 5 millimeters.

17. The electronic display system of claim 13, wherein a clarity of the cover lens is at least eighty percent.

18. The electronic display system of claim 13, wherein the second surface is disposed adjacent to the electronic display.

19. The electronic display system of claim 18, wherein the first surface is opposite the second surface.

20. The electronic display system of claim 13, wherein an angle between the first direction and the third direction is less than 10 degrees.

* * * * *